(12) United States Patent
Abe et al.

(10) Patent No.: US 9,951,246 B2
(45) Date of Patent: Apr. 24, 2018

(54) COMPOSITION FOR HARD COAT, DYED RESIN BODY WITH HARD COAT, AND METHOD FOR PRODUCING DYED RESIN BODY WITH HARD COAT

(71) Applicant: NIDEK CO., LTD., Aichi (JP)

(72) Inventors: Koji Abe, Aichi (JP); Akira Tezuka, Aichi (JP); Minoru Inuzuka, Aichi (JP); Hironori Ebi, Aichi (JP); Motoshi Tanaka, Aichi (JP)

(73) Assignee: NIDEK CO., LTD., Aichi (JP)

( * ) Notice: Subject to any disclaimer, the term of this patent is extended or adjusted under 35 U.S.C. 154(b) by 232 days.

(21) Appl. No.: 14/849,830

(22) Filed: Sep. 10, 2015

(65) Prior Publication Data

US 2016/0075908 A1 Mar. 17, 2016

(30) Foreign Application Priority Data

Sep. 12, 2014 (JP) ................. 2014-186101

(51) Int. Cl.
| | | |
|---|---|---|
| *C09D 135/02* | (2006.01) | |
| *B05D 3/00* | (2006.01) | |
| *C09D 4/00* | (2006.01) | |
| *C08F 222/10* | (2006.01) | |
| *B05D 3/06* | (2006.01) | |

(52) U.S. Cl.
CPC ........... *C09D 135/02* (2013.01); *B05D 3/067* (2013.01); *C09D 4/00* (2013.01)

(58) Field of Classification Search
CPC ......... C09D 135/02; C09D 4/00; B05D 3/067
USPC ........................................... 428/522
See application file for complete search history.

(56) References Cited

U.S. PATENT DOCUMENTS

| | | | | |
|---|---|---|---|---|
| 7,915,319 B2 * | 3/2011 | Konarski | ............ | C08F 290/067 156/182 |
| 2007/0138411 A1 * | 6/2007 | Konarski | ............ | C08F 290/067 250/492.1 |

FOREIGN PATENT DOCUMENTS

| | | | |
|---|---|---|---|
| JP | 2011-213989 | 10/2011 | |
| JP | 2012173626 A * | 9/2012 | |
| JP | 2012173626 A2 | 9/2012 | |
| KR | 20100106287 A * | 10/2010 | |
| WO | 2007078851 A1 | 7/2007 | |
| WO | 2010008174 A2 | 1/2010 | |
| WO | WO 2010008174 A2 * | 1/2010 | ......... C08G 18/4854 |

OTHER PUBLICATIONS

Extended European Search Report dated Oct. 28, 2015 for the corresponding European Patent Application No. 15184853.8.

* cited by examiner

*Primary Examiner* — Michael M Bernshteyn
(74) *Attorney, Agent, or Firm* — Rankin, Hill & Clark LLP

(57) ABSTRACT

A composition for a hard coat according to an embodiment of the present disclosure includes: a trifunctional or more methacrylate monomer and/or acrylate monomer; and a mixed solvent that contains a first solvent including at least one of a glycol-based solvent and a cellosolve-based solvent, and a second solvent including lower alcohol.

10 Claims, 1 Drawing Sheet

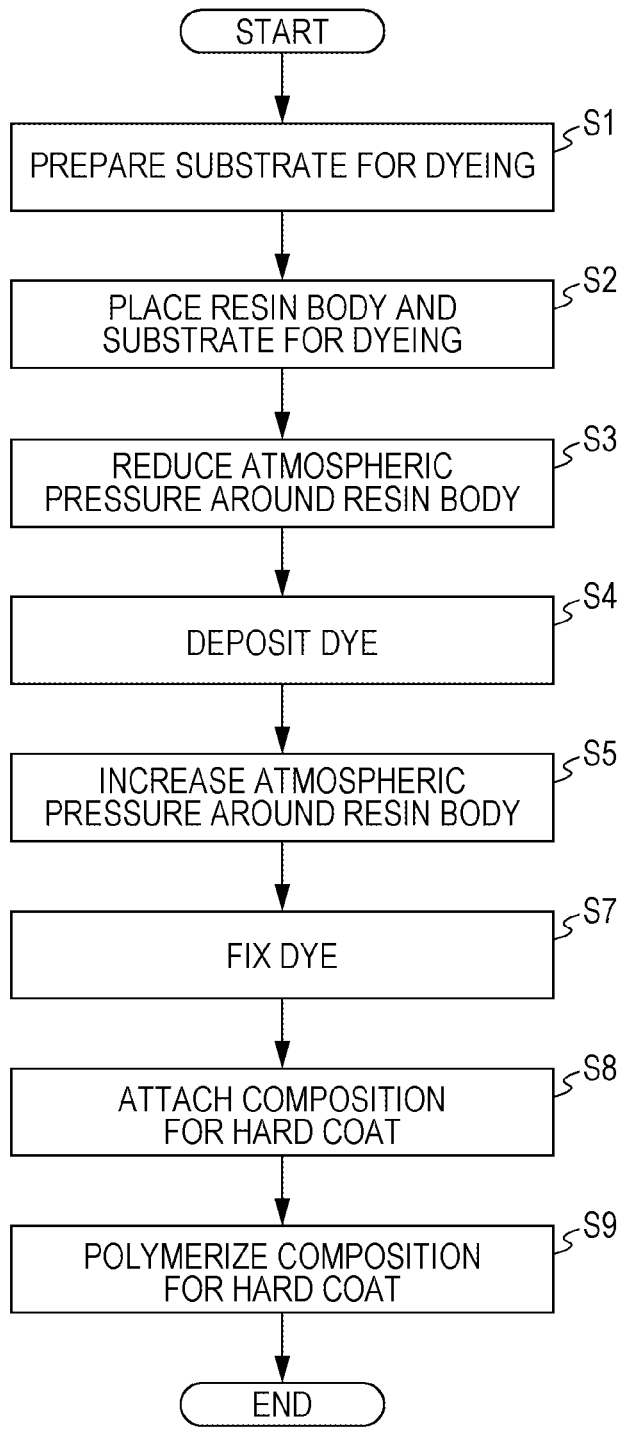

US 9,951,246 B2

COMPOSITION FOR HARD COAT, DYED RESIN BODY WITH HARD COAT, AND METHOD FOR PRODUCING DYED RESIN BODY WITH HARD COAT

CROSS-REFERENCE TO RELATED APPLICATION

This application claims priority from Japanese Patent Application No. 2014-186101 filed with the Japan Patent Office on Sep. 12, 2014, the entire contents of which are hereby incorporated by reference.

BACKGROUND

1. Technical Field

The present disclosure relates to a composition for a hard coat, and a method for producing a dyed resin body with a hard coat.

2. Related Art

Conventionally, there is known a composition for a hard coat to be applied onto a dyed resin body for hard-coating the dyed resin body. There is also known a method for producing a dyed resin body with a hard coat by hard-coating a dyed (dye-containing) resin body. In particular, there is known a resin composition prepared by modifying metal oxide particles with a multifunctional (meth)acrylate monomer modifier. This multifunctional (meth)acrylate monomer modifier is obtained by addition reaction between a modifier having a thiol group and a trifunctional or more (meth)acrylate monomer (JP-A-2011-213989). Such a resin composition is applied as a hard coat liquid onto a resin body (for example, a plastic sheet, a plastic lens, and a plastic film). In this manner, such a composition can be used for improving the mechanical physical properties of a substrate. In some cases, hard-coating may be performed to a resin body dyed by a dyeing treatment.

SUMMARY

A composition for a hard coat according to an embodiment of the present disclosure includes: a trifunctional or more methacrylate monomer and/or acrylate monomer; and a mixed solvent that contains a first solvent including at least one of a glycol-based solvent and a cellosolve-based solvent, and a second solvent including lower alcohol.

BRIEF DESCRIPTION OF DRAWINGS

FIG. 1 is a flow chart for explaining a method for producing a dyed resin body with a hard coat according to an embodiment.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When a dyed resin body subjected to a dyeing treatment is hard-coated, there arises a problem that a hard coat liquid causes the color of the dyed resin body to change (for example, change in concentration and color).

In view of the above problem, a technical object of the present disclosure is to provide a composition for a hard coat, and a method for producing a dyed resin body with a hard coat, which can suppress change in color of the dyed resin body.

To achieve the above object, the present disclosure is configured as described below.

A composition for a hard coat according to an embodiment includes: a trifunctional or more methacrylate monomer and/or acrylate monomer; and a mixed solvent that contains a first solvent including at least one of a glycol-based solvent and a cellosolve-based solvent, and a second solvent including lower alcohol.

In the composition for a hard coat as described above, a content of the first solvent relative to the mixed solvent may be 80% by weight or less.

In the composition for a hard coat as described above, the content of the first solvent relative to the mixed solvent may be 30% by weight or more.

In the composition for a hard coat as described above, the first solvent may be propylene glycol monomethyl ether, and the second solvent may be isopropyl alcohol.

Further, a dyed resin body with a hard coat according to an embodiment includes: a hard coat layer containing a cured product of the composition for a hard coat as described above; and a resin body containing a sublimable dye.

Further, a method for producing a dyed resin body with a hard coat according to an embodiment includes: heating a dye attached to a substrate facing a resin body in a non-contact manner, to sublimate the dye, and then depositing the sublimated dye onto the resin body; fixing the dye by heating the resin body on which the dye is deposited; applying the composition for a hard coat as described above onto the resin body on which the dye is fixed; and curing the composition for a hard coat by irradiating the applied composition for a hard coat with light.

The method for producing a dyed resin body with a hard coat as described above may include fixing the dye by heating with electromagnetic waves the resin body on which the dye is deposited.

The inventors intensively conducted studies, and found a composition which can be particularly suitably used as a composition for a hard coat. This composition contains a bifunctional or more (meth)acrylate monomer and a mixed solvent including a first solvent which contains at least one of a glycol-based solvent and a cellosolve-based solvent, and a second solvent which contains lower alcohol. When a dyed resin body is hard-coated with this composition for a hard coat, the dyed resin body can be suppressed from changing in color. Examples of this resin body include various resin bodies such as plastic sheets, plastic lenses, plastic films, cellular phone covers, automobile light covers, accessories, and toys.

It is noted that examples of the trifunctional or more (meth)acrylate monomer used in the embodiment include the following compounds. The expression " . . . (meth)acrylate" means " . . . acrylate" and " . . . methacrylate".

The composition for a hard coat according to the embodiment contains a trifunctional or more methacrylate monomer and/or and acrylate monomer, a mixed solvent including a first solvent and a second solvent, and as necessary, a photopolymerization initiator.

The trifunctional or more (meth)acrylate monomer is used as a resin for covering a resin body in hard-coating. Examples of the trifunctional or more (meth)acrylate monomer to be used include branched chain and cyclic (meth)acrylates, and urethane acrylates, such as trimethylol propane trimethacrylate, trimethylolpropane triacrylate, ethylene oxide modified trimethylolpropane triacrylate, pentaerythritol triacrylate, pentaerythritol tetraacrylate, dipentaerythritol hexaacrylate, tetramethylol methane triacrylate, tetramethylol methane tetraacrylate, and tris(2-hydroxyethyl)isocyanurate triacrylate. The trifunctional or more (meth)acrylate monomer to be used in the embodiment is not limited to these compounds. Also, one of the trifunctional or more (meth)acrylate monomers described above as examples may be used alone, or two or more thereof may be used in combination.

The first solvent is used together with the second solvent. The first solvent is used for dissolving the trifunctional or more (meth)acrylate monomer. Examples of this first solvent include at least one of a glycol-based solvent and a cellosolve-based solvent. Examples of the glycol-based solvent to be used include propylene glycol monomethyl ether (PGM), propylene glycol monomethyl ether acetate (PG-MEA), ethylene glycol, diethylene glycol, and triethylene glycol. The glycol-based solvent to be used in the embodiment is not limited to these solvents. Examples of the cellosolve-based solvent to be used include methyl cellosolve (ethylene glycol monomethyl ether), ethyl cellosolve (ethylene glycol monoethyl ether), butyl cellosolve (ethylene glycol monobutyl ether), diethylene glycol monomethyl ether, diethylene glycol diethyl ether, di(ethyleneglycol) dibutyl ether, and triethylene glycol monomethyl ether. The cellosolve-based solvent to be used in the embodiment is not limited to these solvents. It is noted that as the first solvent, one glycol-based solvent may be used alone or a plurality of glycol-based solvents may be used in combination. Further, as the first solvent, one of the above-described cellosolve-based solvents may be used alone, or two or more thereof may be used in combination. Further, as the first solvent, a combination of the glycol-based solvent and the cellosolve-based solvent may be used. It is noted that the content (ratio) of the first solvent relative to a total amount of the mixed solvent including the first solvent and the second solvent (hereinafter referred to as the total amount of the mixed solvent) is set to be 80% by weight or less, and particularly 30% by weight to 80% by weight. In this manner, when the content of the first solvent in the mixed solvent is 80% or less, the effect of suppressing change in color of a dyed resin body is enhanced. Further, when the content of the first solvent in the mixed solvent is 30% or more, the reduction in wettability, which is caused by excessively increased lower alcohol, can be suppressed. That is, the composition for a hard coat, which contains the mixed solvent including the first solvent in an amount of 30% by weight to 80% by weight relative to the total amount of the solvent, can be used for a dyed resin body. This can inhibit change in color of a dyed resin body while achieving a highly wettable hard coat.

The second solvent is used together with the first solvent. The second solvent is used for dissolving the trifunctional or more (meth)acrylate monomer. An example of this second solvent includes lower alcohol. Examples of the lower alcohol to be used include methanol, ethanol, isopropyl alcohol (IPA), ethylene glycol, and glycerin. The lower alcohol is not limited to these alcohols. One lower alcohol may be used alone, or a plurality of lower alcohols may be used in combination.

The photopolymerization initiator is used for initiating a reaction for curing the composition for a hard coat with ultraviolet rays or the like. Examples of the photopolymerization initiator to be used include: triazine-based compounds such as tris(chloromethyl)triazine, 2,4-trichloromethyl-(4'-methoxystyryl)-6-triazine, 2-[2-(Furan-2-yl)ethenyl]-4,6-bis(trichloromethyl)-S-triazine, and 2,4,6-tris(trichloromethyl)-S-triazine; benzoin-based compounds such as benzoin methyl ether, benzoin ethyl ether, benzoin isopropyl ether, and benzoin butyl ether; acetophenone-based compounds such as diethoxyacetophenone, 4-phenoxydichloroacetophenone, 2-benzyl-2-dimethylamino-1-(4-morpholinophenyl)-butane-1-one, benzophenone, 2-hydroxy-2-methylproplophenone, 1-hydroxycyclohexyl-phenylketone, and 1-hydroxycyclohexylacetophenone; thioxanthone-based compounds such as thioxanthone, 2-methylthioxanthone, 2,4-dimethylthioxanthone, and 2-chlorothioxanthone; benzyl dimethyl ketal; 2,4,6-trimethylbenzoin diphenylphosphine oxide; N,N-dimethylaminobenzoic acid isoamyl; and acylphosphine oxide. Further, one of these photopolymerization initiators may be used alone, or two or more thereof may be used in combination (as a mixture). The added amount of the photopolymerization initiator relative to the (meth)acrylate monomer is set to be 10% by weight or less, and particularly 0.5 to 5% by weight.

It is noted that the resin composition for a hard coat according to the embodiment may further include, as necessary, additives selected from a bifunctional or less (meth)acrylate monomer, a fluorine resin, and the like. For example, the addition of at least one selected from a bifunctional or less (meth)acrylate monomer and a fluorine resin to the resin composition for a hard coat according to the present example can improve weather fastness (durability) and excoriation resistance.

Examples of the bifunctional or less (meth)acrylate monomer usable in the resin composition for a hard coat according to the embodiment include linear, branched chain, and cyclic(meth)acrylates, and bifunctional or less urethane acrylates, such as methyl(meth)acrylate, n-butyl(meth)acrylate, 2-ethylhexyl(meth)acrylate, n-butoxyethyl(meth)acrylate, methoxypolyethylene glycol(meth)acrylate, benzyl (meth)acrylate, isobornyl(meth)acrylate, 2-hydroxyethyl (meth)acrylate, 2-hydroxypropyl(meth)acrylate, glycidyl (meth)acrylate, N-acryloyloxyethyl hexahydrophthalimide, glycerin di(meth)acrylate, 2-hydroxy3-acryloyl propyl (meth)acrylate, tetrahydrofurfuryl(meth)acrylate, 2-hydroxybutyl(meth)acrylate, ethylene glycol di(meth)acrylate, 1,3-propylene glycol di(meth)acrylate, 1,4-heptanediol di(meth)acrylate, 1,6-hexanediol di(meth)acrylate, di(ethylene glycol) di(eth)acrylate, tetraethylene glycol di(meth) acrylate, 2-butene-1,4-di(meth)acrylate, cyclohexane-1,4-dimethanol di(meth)acrylate, 1,5-pentane di(meth)acrylate, trimethylolethane di(meth)acrylate, trimethylolpropane di(meth)acrylate, dipropylene glycol di(meth)acrylate, 1,3-butylene glycol di(meth)acrylate, and dioxane glycol diacrylate. The usable bifunctional or less (meth)acrylate monomer is not limited to these compounds. Further, one of these bifunctional or less (meth)acrylate monomers may be used alone, or two or more thereof may be used in combination. The content of the bifunctional or less (meth)acrylate monomer relative to the multifunctional (trifunctional or more) (meth)acrylate monomer is set to be 30% by weight or less, and particularly 10% by weight to 25% by weight. When the content of the bifunctional or less (meth)acrylate monomer exceeds 30% by weight, the obtained resin composition coat (hard coat layer) is likely to become excessively soft.

Examples of the fluorine resin usable in the resin composition for a hard coat according to the embodiment include fluorine-based resins such as perfluoropolyether acrylate, perfluoropolyether methacrylate, fluorine-containing polysiloxane, fluorine-containing cyclic polysiloxane, fluorine-containing cyclic polysiloxane acrylate, and fluorine-containing cyclic polysiloxane methacrylate. The usable fluorine resin is not limited to these fluorine resins. Further, one of these fluorine resins may be used alone, or two or more thereof may be used in combination. It is noted that as the fluorine resin, a fluorine resin which is excellent in compatibility with non-fluorine-based organic compounds and which can be photo-cured may be particularly used. The use of such a fluorine resin can improve excoriation resistance even when the fluorine resin is added in a considerably small amount.

The resin composition for a hard coat according to the embodiment may further include, as necessary, photosensitizers, leveling agents, antifoaming agents, fluidity adjusters, light stabilizers, antioxidants, coloring agents, pigments, modifiers having a thiol group (mercapto group) (for details, see JP-A-2011-213989), metal oxide particles, or the like.

Next, a method (steps) for producing a dyed resin body with a hard coat according to the embodiment will be described. The method for producing a dyed resin body with a hard coat according to the embodiment will be described in detail with reference to FIG. 1.

First, a step of preparing a substrate for dyeing (substrate) s performed (S1). In the embodiment, a printer prints on a substrate (for example, paper, glass, or metal) based on print data prepared by a PC with a sublimable dye-containing ink. As a result, a substrate for dyeing is prepared. Accordingly, an appropriate amount of the sublimable dye is accurately attached to the substrate for dyeing at an adequate position. The print data stored in a PC can be easily prepared, changed, and stored. Therefore, complicated dyeing is also easy. Furthermore, similar dyeing can be repeated. However, the substrate for dyeing may be prepared without using a PC and a printer. For example, an operator may use a spray or the like to attach a sublimable dye to paper, thereby to prepare the substrate for dyeing.

Next, an operator places a resin body to be dyed and the substrate for dyeing prepared in S1 at the position where dyeing is to be performed (S2). For example, the substrate for dyeing is positioned such that the surface to which the sublimable dye is attached faces the resin body in a non-contact manner.

Next, a step of reducing the atmospheric pressure around the resin body is performed (S3). For example, gas is discharged outside a closed chamber where deposition is performed, with a pump. Accordingly, the inside of the closed chamber becomes in a substantially vacuum state.

Next, a step of depositing the sublimable dye on the resin body is performed (S4). For example, a heating unit generates electromagnetic waves to heat the substrate for dyeing and the sublimable dye. As a result, the sublimable dye attaching to the substrate for dyeing is heated to be sublimed. The sublimed sublimable dye is deposited onto the resin body. In this manner, a dyed resin body containing a sublimable dye is formed. It is noted that as a heating unit, a halogen lamp that generates infrared rays is used. However, a light source that generates electromagnetic waves having a different wavelength from that of infrared rays, selected from ultraviolet rays, microwaves, and the like, may be used as the heating unit, instead of the halogen lamp. The heating unit can increase the temperature of a dye for a short time by irradiating the substrate for dyeing with electromagnetic waves.

Next, a step of increasing the atmospheric pressure around the resin body is performed (S5). Subsequently, a step of fixing the dye onto the resin body is performed (S7).

In the embodiment, the heating unit used in the deposition step (S4) is driven again. The resin body is irradiated with electromagnetic waves generated by the heating unit. The heating heats with electromagnetic waves the resin body on which the dye is deposited, so that the dye is fixed. In this manner, a fixing treatment can be performed for a short time by performing the fixing step using electromagnetic waves in the fixing step.

It is noted that the embodiment has been described by illustrating as an example the heating unit configured to irradiate the resin body with electromagnetic waves. However, the heating unit to be used in the embodiment is not limited to this example. For example, an oven may be used as the heating unit. The use of an oven allows the deposition step and the fixing step to be performed while the temperature of the resin body gradually increases over an extended period of time. It is noted that as an example of the embodiment, the embodiment in which the heating unit used in the deposition step is also used in the fixing step has been described. However, the embodiment is not limited to this example. The heating unit in the deposition step and the heating unit in the fixing step may be separately provided. In this case, for example, a heating unit to irradiate a resin body with electromagnetic waves may be used in the deposition step, and an oven may be used in the fixing step.

As described above, the resin body is dyed using the substrate for dyeing. Thus, a dyed resin body is produced.

Next, the dyed resin body is hard-coated. The surface of the dyed resin body is coated with the composition for a hard coat by a predetermined thickness using a method selected from spin coating, spray coating, dip coating, bar coating, flow coating, cap coating, knife coating, die coating, roll coating, gravure coating, screen printing, and brushing (S8). Thereafter, the composition for a hard coat applied on the surface of the dyed resin body is irradiated with ultraviolet (ITV) rays. Accordingly, the composition for a hard coat is cured by photopolymerization. As a result, a hard coat layer containing a cured product of the composition for a hard coat is formed on the dyed resin body (S9). This hard coat layer has the effect of improving surface hardness and excoriation resistance. It is noted that the film thickness of the hard coat layer can be set to be 1 to 50 μm, and particularly 1 to 20 μm. Examples of a usable light source for UV irradiation include low-pressure mercury lamps, high-pressure mercury lamps, ultra-high-pressure mercury lamps, electrodeless lamps, xenon lamps, metal halide lamps, carbon arc lights, LED lamps, and tungsten lamps.

It is noted that, prior to application of the composition for a hard coat, the dyed resin body can be subjected to corona discharge, plasma treatment or the like to increase adhesion between the hard coat layer and the dyed resin body. Also, the dyed resin body may be subjected to a coating treatment (for example, primer coating or antireflection coating), prior to application of the composition for a hard coat. Primer coating can improve impact resistance and excoriation resistance. Even when various treatments are performed prior to application of the composition for a hard coat as described above, application of the composition for a hard coat according to the embodiment of the present disclosure increases the effect of suppressing change in color of the dyed resin body caused by the resin body (composition) for a hard coat.

Hard-coating is performed as described above to produce a dyed resin body with a hard coat.

Examples of the resin body material include materials of polycarbonate-based resins (for example, di(ethylene glycol)bisallyl carbonate polymer), polyurethane-based resins, allyl-based resins (for example, allyl diglycol carbonate and copolymer thereof, and diallyl phthalate and copolymer thereof), fumaric acid-based resins (for example, benzyl fumarate copolymer), styrene-based resins, polymethylacrylate-based resins, nylon-based resins, fiber resins (for example, cellulose propionate), and thiourethane-based or thioepoxy. It is noted that the composition for a hard coat according to an embodiment of the present disclosure has low invasiveness. For this reason, the composition for a hard coat is particularly useful for resins having low chemical resistance (for example, polycarbonate-based resins). The resin contained in the resin body having low chemical resistance is likely to be invaded by the composition for a hard coat. Therefore, the dye entering the resin body is likely to be affected. Consequently, the dyed color is likely to change.

Examples of the resin body to which the resin composition for a hard coat according to the embodiment is applicable after dyeing include various resin bodies such as lenses, cellular phone covers, automobile light covers, accessories, and toys. It is noted that the composition for a hard coat according to the present disclosure is useful for a resin body, for example, lenses (plastic lenses), which becomes difficult to be used due to uneven interference fringes caused by the non-uniform film thickness of a hard coat layer. That is, the resin composition for a hard coat according to the embodiment is used to obtain a hard coat layer having a uniform film thickness. For this reason, the resin composition for a hard coat according to the embodiment is useful for a resin body which needs to include a hard coat layer having a uniform film thickness.

It is noted that an embodiment in which a gas phase transfer dyeing is used as a dyeing method for producing the dyed resin body has been described as an example of the embodiment. However, the dyeing method in the embodiment is not limited to the gas phase transfer dyeing. The composition for a hard coat according to the present disclosure is also applicable to a dyed resin body that is dyed by other various dyeing methods. Examples of these various dyeing methods include a dipping dyeing method and a method for kneading into a material for dyeing.

Hereinafter, an embodiment of the present disclosure will be specifically described by illustrating examples and comparative examples. However, the embodiment of the present disclosure is not limited to the following examples. In the following Examples 1 to 18, a resin body dyed by a gas phase transfer dyeing treatment was used. Further, the mixing ratio between at least one of a glycol-based solvent and a cellosolve-based solvent and lower alcohol contained in a mixed solvent was changed. The dyed resin body was measured for color difference (an amount of change in color of a dyed resin body before and after hard-coating) and for wettability (an index indicating how uniformly a hard coat composition is applied onto a resin body). Based on the measurement result, an optimum mixing ratio was confirmed. Further, in Experimental Examples 8 to 18, the color change suppression properties and the wettability of the composition for a hard coat, both being dependent on the mixed solvent including at least one of a glycol-based solvent and a cellosolve-based solvent and lower alcohol, were confirmed. In Comparative Examples 1 to 8, the color change suppression properties and the wettability of a composition for a hard coat prepared without using the mixed solvent as a solvent were confirmed for comparison with the mixed solvents of Experimental Examples 1 to 18.

Experimental Example 1

Into 10 g of a multifunctional acrylate monomer (manufactured by Kyoeisha Chemical Co., Ltd., UA-510H), there were added 0.5 g of a photopolymerization initiator (manufactured by BASF, Irgacure 184), 15.60 g of a first solvent (manufactured by Taiyo Kagaku Co. Ltd., propylene glycol monomethyl ether (hereinafter referred to as PGM)), and 3.90 g of a second solvent (manufactured by Kishida Chemical Co., Ltd., isopropyl alcohol (hereinafter referred to as IPA)). The obtained mixture was stirred to prepare an intended hard coat composition (hard coat liquid) (solvent ratio: first solvent (PGM):second solvent (IPA)=8:2). That is, the hard coat liquid of the present example was prepared such that the ratio of a trifunctional or more acrylate monomer relative to a total amount of the hard coat liquid was 35% by weight (the same applies to the following examples and comparative examples). The above-described hard coat liquid was applied, using a spin coater, onto a dyed resin body (dyed polycarbonate lens) which has been dyed by a gas phase transfer dyeing method. Subsequently, this coated dyed polycarbonate lens was irradiated with ultraviolet rays at approximately 1500 mJ/cm$^2$ in the air atmosphere using a high-pressure mercury lamp to form a hard coat layer having a film thickness of approximately 5 μm.

The dyed polycarbonate lens (lens made of polycarbonate) obtained as described above was measured as below to be evaluated for its performance. The same measurement was similarly performed in other examples described below to evaluate performance.

[Color Difference Test]

The change in color of the dyed polycarbonate lens which has been coated with the hard coat was observed. Specifically, the central portion of the dyed polycarbonate lens was measured for color. As described herein, "color" is recognized as lightness L* and chromaticity a* and b* representing hue and chroma saturation in the L*a*b* colorimetric system (CIE1976). The color of the central portion of the dyed polycarbonate lens was measured using a spectrophotometer DOT-3 (manufactured by Murakami Color Research Laboratory). Thereafter, the lens is placed on a spin coater with its concave surface facing upward. On the lens, 1 to 2 mL of the hard coat liquid prepared as described above was dropped, and left to stand for one minute. After one minute, the spin coater was started to uniformly apply the hard coat liquid over the whole concave surface of the lens. Then, the solvent was removed at 70° C./1 min. Thereafter, ultraviolet rays at 1500 mJ/cm$^2$ were emitted for curing. Afterwards, the color of the central portion of the dyed polycarbonate lens was measured again. The change in color between before and after the formation of the hard coat layer was measured. The change of color was represented by ΔE*, and evaluated according to the following criteria. A method for calculating ΔE* is represented by the following mathematical expression.

$$\Delta E^* = \sqrt{(\Delta L^*)^2 + (\Delta a^*)^2 + (\Delta b^*)^2}$$

The result of ΔE* calculated according to the above mathematical expression was evaluated. The evaluation criteria are defined as below.

0≤ΔE*≤2: A (No problem)

2<ΔE*≤6: B (Color changed a little, but within allowable range (no problem))

6<ΔE*≤8: C (Color changed, but within allowable range (no problem))

8<ΔE*: D (Color significantly changed, with problem)

The above evaluation result is illustrated in Table 1.

[Wettability]

The wettability of the dyed polycarbonate lens coated with the hard coat was observed. Specifically, after the color difference test was completed, the appearance of the dyed polycarbonate lens with the hard coat used in the color difference test was visually inspected. The inspection result was evaluated according to the following criteria.

A: Uniformly coated (no problem with wettability)

B: Not uniformly coated partially, but within allowable range (no problem with wettability)

Example 2 into 10 g of UA-510H, 0.5 g of Irgacure 184, 13.65 g of PGM, and 5.85 g of IPA were added. The obtained mixture was stirred to prepare a hard coat liquid (PGM:IPA=7:3). This hard coat liquid was applied to the dyed polycarbonate lens, which was tested and evaluated in the same manner as in Example 1. The result is illustrated in Table 1.

Example 3

Into 10 g of UA-510H, 0.5 g of Irgacure 184, 11.70 g of PGM, and 7.80 g of IPA were added. The obtained mixture was stirred to prepare a hard coat liquid (PGM:IPA=6:4). This hard coat liquid was applied to the dyed polycarbonate lens, which was tested and evaluated in the same manner as in Example 1. The result is illustrated in Table 1.

Example 4

Into 10 g of UA-510H, 0.5 g of Irgacure 184, 9.75 g of PGM, and 9.75 g of IPA were added. The obtained mixture was stirred to prepare a hard coat liquid (PGM:IPA=5:5). This hard coat liquid was applied to the dyed polycarbonate lens, which was tested and evaluated in the same manner as in Example 1. The result is illustrated in Table 1.

Example 5

Into 10 g of UA-510H, 0.5 g of Irgacure 184, 7.80 g of PGM, and 11.70 g of IPA were added. The obtained mixture was stirred to prepare a hard coat liquid (PGM:IPA=4:6). This hard coat liquid was applied to the dyed polycarbonate lens, which was tested and evaluated in the same manner as in Example 1. The result is illustrated in Table 1.

Example 6

Into 10 g of UA-510H, 0.5 g of Irgacure 184, 5.85 g of PGM, and 13.65 g of IPA were added. The obtained mixture was stirred to prepare a hard coat liquid (PGM:IPA=3:7). This hard coat liquid was applied to the dyed polycarbonate lens, which was tested and evaluated in the same manner as in Example 1. The result is illustrated in Table 1.

Example 7

Into 10 g of UA-510H, 0.5 g of Irgacure 184, 3.90 g of PGM, and 15.60 g of IPA were added. The obtained mixture was stirred to prepare a hard coat liquid (PGM:IPA=2:8). This hard coat liquid was applied to the dyed polycarbonate lens, which was tested and evaluated in the same manner as in Example 1. The result is illustrated in Table 1.

Example 8

A hard coat liquid was prepared in the same manner as in Example 5, except that 10 g of a nonfunctional acrylate monomer (manufactured by Shin Nakamura Chemical Co., Ltd., UA-33H) was used instead of UA-510H. This hard coat liquid was applied to the dyed polycarbonate lens, which was tested and evaluated in the same method as in Example 1. The result is illustrated in Table 1.

Example 9

A hard coat liquid was prepared in the same manner as in Example 5, except that 10.91 g of PGM and 10.91 g of IPA, and furthermore, 1.25 g of a heptafunctional acrylate monomer (manufactured by Kyoeisha Chemical Co., Ltd., DPE-6A) were added. This hard coat liquid was applied to the dyed polycarbonate lens, which was tested and evaluated in the same method as in Example 1. The result is illustrated in Table 1.

Example 10

A hard coat liquid was prepared in the same manner as in Example 5, except that 10.91 g of PGM and 10.91 g of IPA, and furthermore, 1.25 g of a bifunctional acrylate monomer (manufactured by Osaka Organic Chemical Industry Ltd., 1,6-hexanediol diacrylate) were added. This hard coat liquid was applied to the dyed polycarbonate lens, which was tested and evaluated in the same method as in Example 1. The result is illustrated in Table 1.

Example 11

A hard coat liquid was prepared in the same manner as in Example 5, except that 1.95 g of IPA, and, instead of PGM, 17.55 g of a glycol-based solvent (manufactured by Wako Pure Chemical Industries, Ltd., ethylene glycol monoisopropyl ether (2-isopropoxy ethanol)) were used (ethylene glycol monoisopropyl ether:IPA=9:1). This hard coat liquid was applied to the dyed polycarbonate lens, which was tested and evaluated in the same method as in Example 1. The result is illustrated in Table 1.

Example 12

A hard coat liquid was prepared in the same manner as in Example 5, except that 9.75 g of ethylene glycol monoisopropyl ether was used instead of PGM. This hard coat liquid was applied to the dyed polycarbonate lens, which was tested and evaluated in the same method as in Example 1. The result is illustrated in Table 1.

Example 13

A hard coat liquid was prepared in the same manner as in Example 5, except that 17.55 g of IPA, and, instead of PGM, 1.95 g of ethylene glycol monoisopropyl ether were used. This hard coat liquid was applied to the dyed polycarbonate lens, which was tested and evaluated in the same method as in Example 1. The result is illustrated in Table 1.

Example 14

A hard coat liquid was prepared in the same manner as in Example 5, except that 9.75 g of a cellosolve-based solvent (manufactured by Tokyo Chemical Industry Co., Ltd., ethylene glycol monoethyl ether) was used instead of PGM. This hard coat liquid was applied to the dyed polycarbonate lens, which was tested and evaluated in the same method as in Example 1. The result is illustrated in Table 1.

Example 15

A hard coat liquid was prepared in the same manner as in Example 5, except that a solvent including 4.88 g of PGM and 4.88 g of ethylene glycol monoisopropyl ether was used as the first solvent. This hard coat liquid was applied to the dyed polycarbonate lens, which was tested and evaluated in the same method as in Example 1. The result is illustrated in Table 1.

Example 16

A hard coat liquid was prepared in the same manner as in Example 5, except that a solvent including 4.88 g of PGM and 4.88 g of ethylene glycol monoethyl ether was used as the first solvent. This hard coat liquid was applied to the dyed poly-carbonate lens, which was tested and evaluated in the same method as in Example 1. The result is illustrated in Table 1.

Example 17

A hard coat liquid was prepared in the same manner as Example 5, except that 9.75 g of methanol (manufactured by Kishida Chemical Co., Ltd.) was used instead of IPA as the second solvent. This hard coat liquid was applied to the dyed polycarbonate lens, which was tested and evaluated in the same method as in Example 1. The result is illustrated in Table 1.

Example 18

A hard coat liquid was prepared in the same manner as in Example 5, except that 9.75 g of ethylene glycol monoisopropyl ether was used instead of PGM as the first solvent, and 9.75 g of methanol was used instead of IPA as the second solvent. This hard coat liquid was applied to the dyed polycarbonate lens, which was tested and evaluated in the same method as in Example 1. The result is illustrated in Table 1.

TABLE 1

| Experimental Example | Trifunctional or more acrylate monomer | | Solvent | | Bifunctional or less acrylate monomer | Color difference test | Wettability |
|---|---|---|---|---|---|---|---|
| | First acrylate monomer | Second acrylate monomer | First solvent | Second solvent | | | |
| 1 | UA-510H 10 g | None | PGM 15.60 g | IPA 3.90 g | None | B $\Delta E^* = 5.71$ | A |
| 2 | UA-510H 10 g | None | PGM 13.65 g | IPA 5.85 g | None | B $\Delta E^* = 4.12$ | A |
| 3 | UA-510H 10 g | None | PGM 11.70 g | IPA 7.80 g | None | B $\Delta E^* = 2.15$ | A |
| 4 | UA-510H 10 g | None | PGM 9.75 g | IPA 9.75 g | None | A $\Delta E^* = 1.84$ | A |
| 5 | UA-510H 10 g | None | PGM 7.80 g | IPA 11.70 g | None | A $\Delta E^* = 0.93$ | A |
| 6 | UA-510H 10 g | None | PGM 5.85 g | IPA 13.65 g | None | A $\Delta E^* = 0.56$ | A |
| 7 | UA-510H 10 g | None | PGM 3.90 g | IPA 15.60 g | None | A $\Delta E^* = 0.52$ | B |
| 8 | UA-33H 10 g | None | PGM 9.75 g | IPA 9.75 g | None | B $\Delta E^* = 2.43$ | A |
| 9 | UA-510H 10 g | DPE-6A 1.25 g | PGM 10.91 g | IPA 10.91 g | None | A $\Delta E^* = 0.99$ | A |
| 10 | UA-510H 10 g | None | PGM 10.91 g | IPA 10.91 g | 1.6-hexanediol diacrylate 1.25 g | A $\Delta E^* = 1.57$ | A |
| 11 | UA-510H 10 g | None | 2-isopropoxy ethanol 17.55 g | IPA 1.95 g | None | C $\Delta E^* = 6.50$ | A |
| 12 | UA-510H 10 g | None | 2-isopropoxy ethanol 9.75 g | IPA 9.75 g | None | A $\Delta E^* = 0.62$ | A |
| 13 | UA-510H 10 g | None | 2-isopropoxy ethanol 1.95 g | IPA 17.55 g | None | A $\Delta E^* = 0.38$ | B |
| 14 | UA-510H 10 g | None | Ethyl cellosolve 9.75 g | IPA 9.75 g | None | A $\Delta E^* = 1.28$ | A |
| 15 | UA-51014 10 g | None | PGM 2-isopropoxy ethanol 4.88 g/4.88 g | IPA 10.45 g | None | B $\Delta E^* = 3.29$ | A |
| 16 | UA-510H 10 g | None | PGM Ethylene grycol monoethyl ether 4.88 g/4.88 g | IPA 10.45 g | None | B $\Delta E^* = 2.70$ | A |
| 17 | UA-510H 10 g | None | PGM 9.75 g | Methanol 9.75 g | None | A $\Delta E^* = 1.25$ | A |

TABLE 1-continued

| Experimental Example | Trifunctional or more acrylate monomer | | Solvent | | Bifunctional or less acrylate monomer | Color difference test | Wettability |
|---|---|---|---|---|---|---|---|
| | First acrylate monomer | Second acrylate monomer | First solvent | Second solvent | | | |
| 18 | UA-510H 10 g | None | 2-isopropoxy ethanol 9.75 g | Methanol 9.75 g | None | B $\Delta E^* = 2.54$ | A |

Comparative Example 1

Into 10 g of UA-510H, 0.5 g of Irgacure 184 and 19.50 g of PGM were added. The obtained mixture was stirred to prepare a hard coat liquid (PGM:WA=10:0). This hard coat liquid was applied to the dyed polycarbonate lens, which was tested and evaluated in the same method as in Example 1. The result is illustrated in Table 2.

Comparative Example 2

A hard coat liquid was prepared in the same manner as in Comparative Example 1, except that 10 g of a nonfunctional acrylate monomer (manufactured by Shin Nakamura Chemical Co., Ltd., UA-33H) was used instead of UA-510H. This hard coat liquid was applied to the dyed polycarbonate lens, which was tested and evaluated in the same method as in Example 1. The result is illustrated in Table 1.

Comparative Example 3

A hard coat liquid was prepared in the same manner as in Comparative Example 1, except that 21.82 g of PGM, and furthermore, 1.25 g of a heptafunctional acrylate monomer (manufactured by Kyoeisha Chemical Co., Ltd., DPE-6A) were added. This hard coat liquid was applied to the dyed polycarbonate lens, which was tested and evaluated in the same method as in Example 1. The result is illustrated in Table 2.

Comparative Example 4

A hard coat liquid was prepared in the same manner as in Comparative Example 1, except that 21.82 g of PGM, and furthermore, 1.25 g of a bifunctional acrylate monomer (manufactured by Osaka Organic Chemical Industry Ltd., 1,6-hexanediol diacrylate) were added. This hard coat liquid was applied to the dyed polycarbonate lens, which was tested and evaluated in the same method as in Example 1. The result is illustrated in Table 2.

Comparative Example 5

A hard coat liquid was prepared in the same manner as Comparative Example 1, except that 19.50 g of a glycol-based solvent (manufactured by Wako Pure Chemical Industries, Ltd., ethylene glycol monoisopropyl ether) was used instead of PGM. This hard coat liquid was applied to the dyed polycarbonate lens, which was tested and evaluated in the same method as in Example 1. The result is illustrated in Table 2.

Comparative Example 6

A hard coat liquid was prepared in the same manner as in Comparative Example 1, except that 19.50 g of a cellosolve-based solvent (manufactured by Tokyo Chemical Industry Co., Ltd., ethylene glycol monoethyl ether) was used instead of PGM. This hard coat liquid was applied to the dyed polycarbonate lens, which was tested and evaluated in the same method as in Example 1. The result is illustrated in Table 2.

Comparative Example 7

A hard coat liquid was prepared in the same manner as in Comparative Example 1, except that a solvent including 9.75 g of PGM and 9.75 g of ethylene glycol monoisopropyl ether was used as the first solvent. This hard coat liquid was applied to the dyed poly-carbonate lens, which was tested and evaluated in the same method as in Example 1. The result is illustrated in Table 2.

Comparative Example 8

A hard coat liquid was prepared in the same manner as in Comparative Example 1, except that a solvent including 9.75 g of PGM and 9.75 g of ethylene glycol monoethyl ether was used as the first solvent. This hard coat liquid was applied to the dyed polycarbonate lens, which was tested and evaluated in the same method as in Example 1. The result is illustrated in Table 2.

TABLE 2

| Comparative Example | Trifunctional or more acrylate monomer | | Solvent | | Bifunctional or less acrylate monomer | Color difference test | Wettability |
|---|---|---|---|---|---|---|---|
| | First acrylate monomer | Second acrylate monomer | First solvent | Second solvent | | | |
| 1 | UA-510H 10 g | None | PGM 19.50 g | IPA 0.00 g | None | D $\Delta E^* = 37.7$ | A |
| 2 | UA-33H 10 g | None | PGM 19.50 g | IPA 0.00 g | None | D $\Delta E^* = 41.5$ | A |

TABLE 2-continued

| Comparative Example | Trifunctional or more acrylate monomer | | Solvent | | Bifunctional or less acrylate monomer | Color difference test | Wettability |
|---|---|---|---|---|---|---|---|
| | First acrylate monomer | Second acrylate monomer | First solvent | Second solvent | | | |
| 3 | UA-510H 10 g | DPE-6A 1.25 g | PGM 21.82 g | IPA 0.00 g | None | D ⊿E* = 25.17 | A |
| 4 | UA-510H 10 g | None | PGM 21.82 g | IPA 0.00 g | 1.6-hexanediol diacrylate 1.25 g | D ⊿E* = 26.73 | A |
| 5 | UA-510H 10 g | None | 2-isopropoxy ethanol 19.50 g | IPA 0.00 g | None | D ⊿E* = 8.50 | A |
| 6 | UA-510H 10 g | None | Ethyl cellosolve 19.50 g | IPA 0.00 g | None | D ⊿E* = 20.50 | A |
| 7 | UA-510H 10 g | None | PGM 2-isopropoxy ethanol 9.75 g/9.75 g | IPA 0.00 g | None | D ⊿E* = 25.07 | A |
| 8 | UA-510H 10 g | None | PGM/ Ethylene grycol monoethyt ether 9.75 g/9.75 g | IPA 0.00 g | None | ⊿E* = 42.72 | |

(Result)

As shown in Table 1 and Table 2, the change in color (color difference) of a dyed resin body can be suppressed by hard-coating the dyed resin body with a composition for a hard coat containing a mixed solvent which includes a first solvent including at least one of a glycol-based solvent and a cellosolve-based solvent and a second solvent including lower alcohol. That is, a dyed resin body can be hard-coated with the composition for a hard coat according to an embodiment of the present disclosure without change in color of the dyed resin body. The implemented hard coat satisfies the condition of good adhesion to the dyed resin body and excoriation resistance.

The effect of suppressing change in color of the dyed resin body can be enhanced (i.e., ΔE* is evaluated as A or B) by hard coating the dyed resin body with a composition for a hard coat containing a mixed solvent in which the content of the first solvent (the ratio relative to the total amount of the mixed solvent including the first solvent and the second solvent) is 80% by weight or less (see Examples 1 to 10, and Examples 12 to 18).

Furthermore, the reduction in wettability caused by excessively increased lower alcohol can be suppressed (i.e., wettability is evaluated as A), by using a composition for a hard coat containing a mixed solvent in which the content of the first solvent is 30% by weight or more (see Examples 1 to 6, Examples 8 to 12, and Examples 14 to 18). That is, the dyed resin body can be hard-coated in such a manner that the change in color of the resin body is suppressed while the wettability is high, by using a composition for a hard coat which contains a mixed solvent including the first solvent in an amount of 30% by weight to 80% by weight.

Further, the composition for a hard coat according to the present disclosure is particularly useful when a fixing treatment s performed for a short time using electromagnetic waves in the fixing step by the gas phase transfer method. That is, the fixing step is performed for a shorter time in the fixing step using electromagnetic waves than in the fixing step using an oven. For this reason, a dye does not deeply enter the resin body. As a result, a large amount of a dye remains at a shallow position from the surface of the resin body. Therefore, when a composition for a hard coat is used, the surface and its vicinity of the resin body is invaded (eluted), thereby causing a dye present in the vicinity of the surface to be readily affected. As a result, when the dyed resin body including a large amount of a dye remaining on the surface thereof is hard-coated with a composition for a hard coat, the dye of the dyed resin body is easily lost, so that color is likely to change. However, according to the composition for a hard coat of the present disclosure, even the dyed resin body including a large amount of a dye remaining at a shallow position from the surface of the resin body can be hard-coated in such a manner that adhesion and excoriation resistance are high without change in color of the resin body.

The resin composition for a hard coat according to an embodiment of the present disclosure may be the first to seventh resin compositions for a hard coat as described below.

The first resin composition for a hard coat has a trifunctional or more (meth)acrylate monomer, and a solvent which dissolves the trifunctional or more (meth)acrylate monomer and which contains a mixture of a first solvent including at least one of a glycol-based solvent and a cellosolve-based solvent and a second solvent including lower alcohol, wherein the first resin composition is attached to a dyed resin body in order to hard-coat a resin body dyed by depositing and fixing a sublimable dye onto the resin body.

The second resin composition for a hard coat is the first composition for a hard coat including the solvent in which the first solvent is mixed in a ratio of 80% by weight or less relative to a total amount of the solvent.

The third hard coat composition is the first or second composition for a hard coat including the solvent in which the first solvent is mixed in a ratio of 30% by weight or more relative to the total amount of the solvent.

The fourth hard coat composition is any of the first to third compositions for a hard coat, wherein the first solvent is propylene glycol monomethyl ether, and the second solvent is isopropyl alcohol.

The fifth composition for a hard coat has a trifunctional or more (meth)acrylate monomer and a solvent which dissolves the trifunctional or more (meth)acrylate monomer and which contains a mixture of a first solvent including at least one of a glycol-based solvent and a cellosolve-based solvent and a second solvent including lower alcohol, wherein the fifth composition for a hard coat is attached to a dyed resin body for hard coating the dyed resin body, and includes the solvent in which the first solvent is mixed in a ratio of 80% by weight or less relative to a total amount of the solvent.

The sixth hard coat composition is the fifth composition for a hard coat described above wherein the first solvent is mixed in a ratio of 30% by weight or more relative to a total amount of the solvent.

The seventh composition for a hard coat is the fifth or sixth composition for a hard coat, wherein the first solvent is propylene glycol monomethyl ether, and the second solvent is isopropyl alcohol.

Also, the method for producing a dyed resin body with a hard coat according to an embodiment of the present disclosure may be a first or second method for producing a dyed resin body with a hard coat described below.

The first method for producing a dyed resin body with a hard coat includes: a deposition step of placing a substrate, onto which a dye is attached, and a resin body so as to face each other in a non-contact manner, and heating the dye so that the dye attached to the substrate sublimates to be deposited onto the resin body; a fixing step of heating the resin body, on which the dye has been deposited, so that the dye is fixed; and a hard coating step of attaching, to the resin body on which the dye is fixed, a composition for a hard coat which has a trifunctional or more (meth)acrylate monomer and a solvent, for dissolving the trifunctional or more (meth)acrylate monomer, which contains a mixture of a first solvent including at least one of a glycol-based solvent and a cellosolve-based solvent and a second solvent including lower alcohol, wherein a dyed resin body with a hard coat is manufactured by hard coating the dyed resin body.

The second method for producing a dyed resin body with a hard coat is the first manufacturing method of a dyed resin body with a hard coat described above, wherein the fixing step includes heating the resin body, on which the dye has been deposited, with electromagnetic waves, so that the dye is fixed.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A composition for a hard coat comprising:
   a trifunctional or more methacrylate monomer and/or acrylate monomer; and
   a mixed solvent that contains a first solvent including at least one of a glycol-based solvent and a cellosolve-based solvent, and a second solvent including lower alcohol,
   wherein a content of the first solvent relative to the mixed solvent is 30% by weight or more and 80% by weight or less.

2. The composition for the hard coat according to claim 1, wherein
   the first solvent is propylene glycol monomethyl ether, and
   the second solvent is isopropyl alcohol.

3. A dyed resin body with a hard coat, comprising:
   a hard coat layer containing a cured product of the composition for the hard coat according to claim 1; and
   a resin body containing a sublimable dye.

4. A dyed resin body with a hard coat, comprising:
   a hard coat layer containing a cured product of the composition for the hard coat according to claim 2; and
   a resin body containing a sublimable dye.

5. A method for producing the dyed resin body with the hard coat according to claim 3, comprising:
   heating a dye attached to a substrate facing a resin body in a non-contact manner, to sublimate the dye, and then depositing the sublimated dye onto the resin body;
   fixing the dye by heating the resin body on which the dye is deposited;
   applying the composition for the hard coat onto the resin body on which the dye is fixed; and
   curing the composition for the hard coat by irradiating the applied composition for the hard coat with light.

6. The method for producing the dyed resin body with the hard coat according to claim 5, further comprising
   fixing the dye by heating with electromagnetic waves the resin body on which the dye is deposited.

7. The dyed resin body with the hard coat according to claim 3, wherein the resin body is a lens.

8. The composition for the hard coat according to claim 1, wherein
   the lower alcohol is at least one selected from a group consisting of methanol, ethanol, isopropyl alcohol, ethylene glycol and glycerin.

9. The composition for the hard coat according to claim 1, wherein the trifunctional or more methacrylate monomer and/or acrylate monomer is dissolved in the mixed solvent.

10. The composition for the hard coat according to claim 8, wherein
    the trifunctional or more methacrylate monomer and/or acrylate monomer is dissolved in the mixed solvent.

* * * * *